United States Patent
Landin et al.

(10) Patent No.: US 7,363,462 B2
(45) Date of Patent: Apr. 22, 2008

(54) PERFORMING VIRTUAL TO GLOBAL ADDRESS TRANSLATION IN PROCESSING SUBSYSTEM

(75) Inventors: Anders Landin, San Carlos, CA (US); Erik E. Hagersten, Uppsala (SE)

(73) Assignee: Sun Microsystems, Inc., Santa Clara, CA (US)

( * ) Notice: Subject to any disclaimer, the term of this patent is extended or adjusted under 35 U.S.C. 154(b) by 455 days.

(21) Appl. No.: 10/817,689

(22) Filed: Apr. 2, 2004

(65) Prior Publication Data

US 2004/0260906 A1    Dec. 23, 2004

Related U.S. Application Data

(60) Provisional application No. 60/460,569, filed on Apr. 4, 2003.

(51) Int. Cl.
  *G06F 12/10*  (2006.01)
  *G06F 10/10*  (2006.01)
  *G06F 12/08*  (2006.01)

(52) U.S. Cl. .......... 711/203; 711/206; 711/122

(58) Field of Classification Search ........ None
See application file for complete search history.

(56) References Cited

U.S. PATENT DOCUMENTS

| | | | |
|---|---|---|---|
| 5,761,721 A | 6/1998 | Baldus et al. | |
| 5,802,582 A | 9/1998 | Ekanadham et al. | |
| 5,822,785 A | 10/1998 | Ikeda et al. | |
| 5,896,501 A | 4/1999 | Ikeda et al. | |
| 5,940,870 A * | 8/1999 | Chi et al. | 711/206 |
| 6,088,768 A | 7/2000 | Baldus et al. | |
| 6,209,064 B1 | 3/2001 | Weber | |
| 6,275,900 B1 | 8/2001 | Liberty | |
| 2002/0112124 A1 * | 8/2002 | Arimilli et al. | 711/122 |

OTHER PUBLICATIONS

"Specifying and Verifying a Broadcast and a Multicast Snooping Cache Coherence Protocol", Sorin, et al, *IEEE Transactions on Parallel and Distributed Systems*, vol. 13, No. 6, Jun. 2002, http://www.cs.wisc.edu/multifacet/papers/tpds02_lamport.pdf.
"Multicast Snooping: A New Coherence Method Using a Multicast Address Network", Bilir, et al, *The 26th International Symposium on Computer Architecture*, IEEE, Atlanta, GA, May 2-4, 1999, http://csdl.computer.org/comp/proceedings/isca/1999/0170/00/01700294abs.htm.

(Continued)

*Primary Examiner*—Hyung S. Sough
*Assistant Examiner*—Duc T. Doan
(74) *Attorney, Agent, or Firm*—Meyertons Hood Kivlin Kowert & Goetzel, P.C.

(57) ABSTRACT

A system may include a plurality of nodes. Each node may include one or more active devices coupled to one or more memory subsystems. Each active device in one of the plurality of nodes includes a memory management unit configured to receive a virtual address generated within that active device and to responsively output a global address and associated information that identifies a translation function. The memory subsystem in the one of the plurality of nodes is configured to apply the translation function identified in the information to the global address to generate a local physical address.

18 Claims, 10 Drawing Sheets

OTHER PUBLICATIONS

"Architecture and Design of AlphaServer GS320", Gharachorloo, et al, *ACM Sigplan Notices,* vol. 35, Issue 11, Nov. 2000, http://portal.acm.org/citation.cfm?id=356991&dl=ACM&coll=portal.

"View Caching: Efficient Software Shared Memory for Dynamic Computations", Karamcheti, et al, *11th International Parallel Processing Symposium,* Geneva, Switzerland, Apr. 1-5, 1997, http://ipdps.eece.unm.edu/1997/s13/318.pdf.

"Cache-Coherent Distributed Shared Memory: Perspectives on Its Development and Future Challenges", Hennessy, et al, *Proceedings of the IEEE,* vol. 87, Issue 3, Mar. 1999, ISSN 0018-9219, http://cva.stanford.edu/cs99s/papers/hennessy-cc.pdf.

"Survey on Cache Coherence in Shared & Distributed Memory Multiprocessors", Garg, et al, Online, http://www.cse.psu.edu/~cg530/proj03/cache_coherence.pdf.

"A Survey of Cache Coherence Mechanisms in Shared Memory Multiprocessors", Lawrence, Department of Computer Science, University of Manitoba, Manitoba, Canada, May 14, 1998, http://www.cs.uiowa.edu/~rlawrenc/research/Papers/cc.pdf.

"Bandwidth Adaptive Snooping", Martin, et al. *8th Annual International Symposium on High-Performance Computer Architecture (HPCA-8),* Cambridge, MA, Feb. 2-6, 2002.

"Timestamp Snooping: An Approach for Extending SMPs", Martin, et al., *9th International Conference on Architectural Support for Programming Languages and Operating Systems (ASPLOS-IX),* Cambridge, MA, Nov. 13-15, 2000.

\* cited by examiner

PERFORMING VIRTUAL TO GLOBAL ADDRESS TRANSLATION IN PROCESSING SUBSYSTEM

PRIORITY INFORMATION

This application claims priority to U.S. provisional application Ser. No. 60/460,569, entitled "PERFORMING VIRTUAL TO GLOBAL ADDRESS TRANSLATION IN PROCESSING SUBSYSTEM", filed Apr. 4, 2003.

BACKGROUND OF THE INVENTION

1. Field of the Invention

This invention relates to the field of multiprocessing computer systems and, more particularly, to performing coherent memory replication within multiprocessing computer systems.

2. Description of the Related Art

Multiprocessing computer systems include two or more processors that may be employed to perform computing tasks. A particular computing task may be performed on one processor while other processors perform unrelated computing tasks. Alternatively, components of a particular computing task may be distributed among multiple processors to decrease the time required to perform the computing task as a whole.

A popular architecture in commercial multiprocessing computer systems is the symmetric multiprocessor (SMP) architecture. Typically, an SMP computer system includes multiple processors connected through a cache hierarchy to a shared bus. The bus provides the processors access to a shared memory. Access to any particular memory location within the memory occurs in a similar amount of time as access to any other particular memory location. Since each location in the memory may be accessed in a uniform manner, this structure is often referred to as a uniform memory architecture (UMA).

Processors are often configured with internal caches, and one or more caches are typically included in the cache hierarchy between the processors and the shared bus in an SMP computer system. Multiple copies of data residing at a particular main memory address may be stored in these caches. In order to maintain the shared memory model, in which a particular address stores exactly one data value at any given time, shared bus computer systems employ cache coherency. An operation is coherent if the effects of the operation upon data stored at a particular memory address are reflected in each copy of the data within the cache hierarchy. For example, when data stored at a particular memory address is updated, the update may be supplied to the caches that are storing copies of the previous data. Alternatively, the copies of the previous data may be invalidated in the caches such that a subsequent access to the particular memory address causes the updated copy to be transferred from main memory. For shared bus systems, a snoop bus protocol is typically employed. Each coherent transaction performed upon the shared bus is examined (or "snooped") against data in the caches. If a copy of the affected data is found, the state of the cache line containing the data may be updated in response to the coherent transaction.

Unfortunately, shared bus architectures suffer from several drawbacks which limit their usefulness in multiprocessing computer systems. A bus is capable of a peak bandwidth (e.g., a number of bytes/second which may be transferred across the bus). As additional processors are attached to the bus, the bandwidth required to fully supply the processors with data and instructions may exceed the peak bus bandwidth. Since some processors are forced to wait for available bus bandwidth, performance of the computer system suffers when the bandwidth requirements of the processors exceeds available bus bandwidth. Performance may also be adversely affected due to capacitive loading on the shared bus, which increases as more processors are added to the system. Furthermore, as processor performance increases, buses that previously provided sufficient bandwidth for a multiprocessing computer system may be insufficient for a similar computer system employing higher performance processors.

Another structure for multiprocessing computer systems is a distributed shared memory architecture. A distributed shared memory architecture includes multiple nodes, each of which includes one or more processors and one or more memory devices. The multiple nodes communicate via a network. When considered as a whole, the memory included within the multiple nodes forms the shared memory for the computer system. Typically, directories are used to identify which nodes have cached copies of data corresponding to a particular address. Coherency activities may be generated via examination of the directories.

Distributed shared memory systems are scaleable, overcoming the limitations of the shared bus architecture. Since many of the processor accesses are completed within a node, nodes typically have much lower bandwidth requirements upon the network than a shared bus architecture must provide upon its shared bus. The nodes may operate at high clock frequency and bandwidth, accessing the network when needed. Additional nodes may be added to the network without affecting the local bandwidth of the nodes. Instead, only the network bandwidth is affected.

Distributed shared memory systems may employ local and global address spaces. The global address space encompasses memory in more than one node. In contrast, local physical address space may only describe memory within a single node. Accesses to the address space within a node (i.e., access to local physical address space) are typically local transactions, which may not involve activity on the network that couples the nodes. Accesses to portions of the address space not assigned to the requesting node are typically global transactions and may involve activity on the network.

In some distributed shared memory systems, data corresponding to addresses of remote nodes may be copied to a requesting node's shared memory such that future accesses to that data may be performed via local transactions rather than global transactions. In such systems, processors local to the node may access the data using the local physical address assigned to the copied data. Remote processors external to that node may use the global address to access the data. Address translation tables are provided to translate between the global address and the local physical address. Improved systems for implementing address translations between global and local physical addresses are desired.

SUMMARY

Various embodiments of systems and methods for performing virtual to global address translation in a processing subsystem within a multi-node computer system are disclosed. In one embodiment, a system may include a plurality of nodes. Each node may include one or more active devices coupled to one or more memory subsystems. Each active device in one of the plurality of nodes includes a memory management unit configured to receive a virtual address generated within that active device and to responsively output a global address and associated information that identifies a translation function. The memory subsystem in the one of the plurality of nodes is configured to apply the translation function identified in the information to the global address to generate a local physical address.

BRIEF DESCRIPTION OF THE DRAWINGS

A better understanding of the present invention can be obtained when the following detailed description is considered in conjunction with the following drawings, in which.

Figure 1:
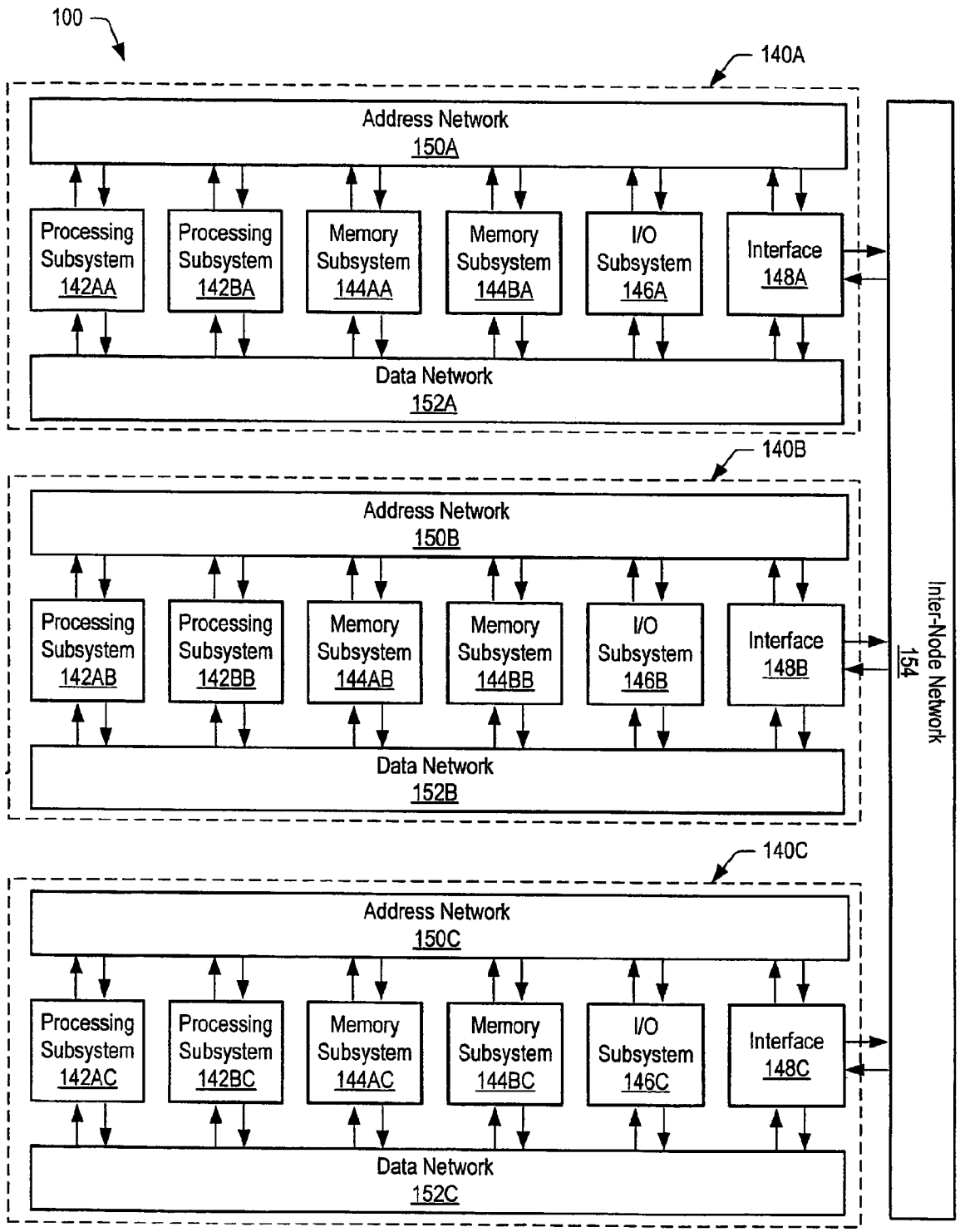
FIG. 1 is a block diagram of a multiprocessing computer system, according to one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Multi-Node Computer System

FIG. 1 illustrates a multi-node computer system 100, according to one embodiment. In the embodiment of FIG. 1, multi-node computer system 100 includes three nodes 140A-140C (collectively referred to as nodes 140). Each node includes several client devices. For example, node 140A includes processing subsystems 142AA and 142AB, memory subsystems 144AA and 144AB, I/O subsystem 146A, and interface 148A. The client devices in node 140A share address network 150A and data network 152A. In the illustrated embodiment, nodes 140B and 140C contain similar client devices (identified by reference identifiers ending in "B" and "C" respectively). Note that different nodes may include different numbers of and/or types of client devices, and that some types of client devices may not be included in some nodes.

As used herein, a node is a group of client devices (e.g., processing subsystems 142, memory subsystems 144, and/or I/O subsystems 146) that share the same address and data networks. By linking multiple nodes, the number of client devices in the computer system 100 may be adjusted independently of the size limitations of any individual node 140.

Each node 140 communicates with other nodes in computer system 100 via an interface 148 (interfaces 148A-148C are collectively referred to as interfaces 148). Some nodes may include more than one interface. Interfaces 148 may communicate by sending packets of address and/or data information on inter-node network 154.

Each of processing subsystems 142 and I/O subsystem 146 may access memory subsystems 144. Devices configured to perform accesses to memory subsystems 144 are referred to herein as "active" devices. Because each active device within computer system 140 may access data in memory subsystems 144, potentially caching the data, memory subsystems 144 and active devices such as processing systems 142 may implement a coherency protocol in order to maintain data coherency between processing subsystems 142 and memory subsystems 144. Each client in FIG. 1 may be configured to participate in the coherency protocol by sending address messages on address network 150 and data messages on data network 152 using split-transaction packets.

Memory subsystems 144 are configured to store data and instruction code for use by processing subsystems 142 and I/O subsystem 146. Memory subsystems 144 may include dynamic random access memory (DRAM), although other types of memory may be used in some embodiments.

I/O subsystem 146 is illustrative of a peripheral device such as an input-output bridge, a graphics device, a networking device, etc. In some embodiments, I/O subsystem 146 may include a cache memory subsystem similar to those of processing subsystems 142 for caching data associated with addresses mapped within one of memory subsystems 144.

In one embodiment, data network 152 may be a logical point-to-point network. Data network 152 may be implemented as an electrical bus, a circuit-switched network, or a packet-switched network. In embodiments where data network 152 is a packet-switched network, packets may be sent through the data network using techniques such as wormhole, store and forward, or virtual cut-through. In a circuit-switched network, a particular client device may communicate directly with a second client device via a dedicated point-to-point link that may be established through a switched interconnect mechanism. To communicate with a third client device, the particular client device utilizes a different link as established by the switched interconnect than the one used to communicate with the second client device. Messages upon data network 152 are referred to herein as data packets. Note that in some embodiments, address network 150 and data network 152 may be implemented using the same physical interconnect.

Address network 150 accommodates communication between processing subsystems 142, memory subsystems 144, and I/O subsystem 146. Messages upon address network 150 are generally referred to as address packets. In some embodiments, address packets may correspond to requests for an access right (e.g., a readable or writable copy of a cacheable coherency unit) or requests to perform a read or write to a non-cacheable memory location. Address packets may be sent by an active device in order to initiate a coherency transaction. Subsequent address packets may be sent by other devices in order to implement the access right and/or ownership changes needed to satisfy the coherence request. In the computer system 140 shown in FIG. 1, a coherency transaction may include one or more packets upon address network 150 and data network 152. Typical coherency transactions involve one or more address and/or data packets that implement data transfers, ownership transfers, and/or changes in access privileges. If activity within more than one node 140 is needed to complete a coherency transaction, that coherency transaction may also involve one or more packets on inter-node network 154.

When an address packet references a coherency unit, the referenced coherency unit may be specified via an address conveyed within the address packet upon address network 150. As used herein, a coherency unit is a number of contiguous bytes of memory that are treated as a unit for coherency purposes. For example, if one byte within the coherency unit is updated, the entire coherency unit is considered to be updated. In response to an address packet that references a coherency unit, data corresponding to the address packet on the address network 150 may be conveyed upon data network 152. Communications upon address network 150 may be point-to-point or broadcast, depending on the embodiment.

Various active devices such as I/O subsystems 146 and/or processing subsystems 142 may be configured to access data in any node 140 within computer system 100. Several different address spaces may be used to describe the data stored in computer system 100. Virtual addresses, which may be generated within each processing device while executing program instructions, may form one address space. A global address space may include addresses that identify each unique coherency unit stored within any of the nodes in computer system 100, allowing a device in one node to identify data stored in another node. Local physical address space may be unique to each node and contains the physical addresses that are used to access coherency units within the local memory of each node. The local memory of each node includes the memory included in the memory subsystem(s) 144 in that node 140. A memory subsystem 144 is said to "map" a particular global address if the data identified by that global address is stored at a local physical address within that memory subsystem. Various translation functions may map an address specified in one address space to an address within another address space, as described in more detail below.

Active devices within each node 140 may be configured to use global addresses to specify data when sending address packets in coherency transactions. An active device in one node 140A may access data in another node 140B by sending an address packet specifying the data's global address. The memory subsystems 144 may translate a global address received in an address packet to a local physical address and use that local physical address to access the specified coherency unit.

Nodes 140 may perform coherent memory replication so that memory subsystems 144 in different nodes may store copies of the same coherency unit. A replicated coherency unit may be identified by a particular global address, and each memory subsystem 144 that replicates that coherency unit maps that global address to a local physical address. Each replicating node may map the global address to a different local physical address. After performing coherent memory replication, an active device within a replicating node may access the replicated copy of data from a local memory subsystem instead of having to access the data from a memory subsystem in another node. Each node may replicate different portions of the global address space. The coherency protocol may maintain coherency both among the various caches that may store a copy of a particular coherency unit and among the various memory subsystems that may replicate a copy of a particular coherency unit.

A node may be described as being a "mapping" node for a particular coherency unit if a memory subsystem 144 within that node 140 maps the coherency unit. A coherency unit may have multiple mapping nodes. In some embodiments, a single mapping node may be designated as the home node for each coherency unit. The home node for a particular coherency unit may serve as an ordering point for multi-node coherency transactions involving that coherency unit. A node is a non-mapping node with respect to a particular coherency unit if that node does not include any memory subsystem that maps the coherency unit. Global addresses may also be described as being "mapped" global addresses and non-mapped global addresses with respect to a particular node dependent on whether that node is a mapping or non-mapping node for that global address.

Figure 2:
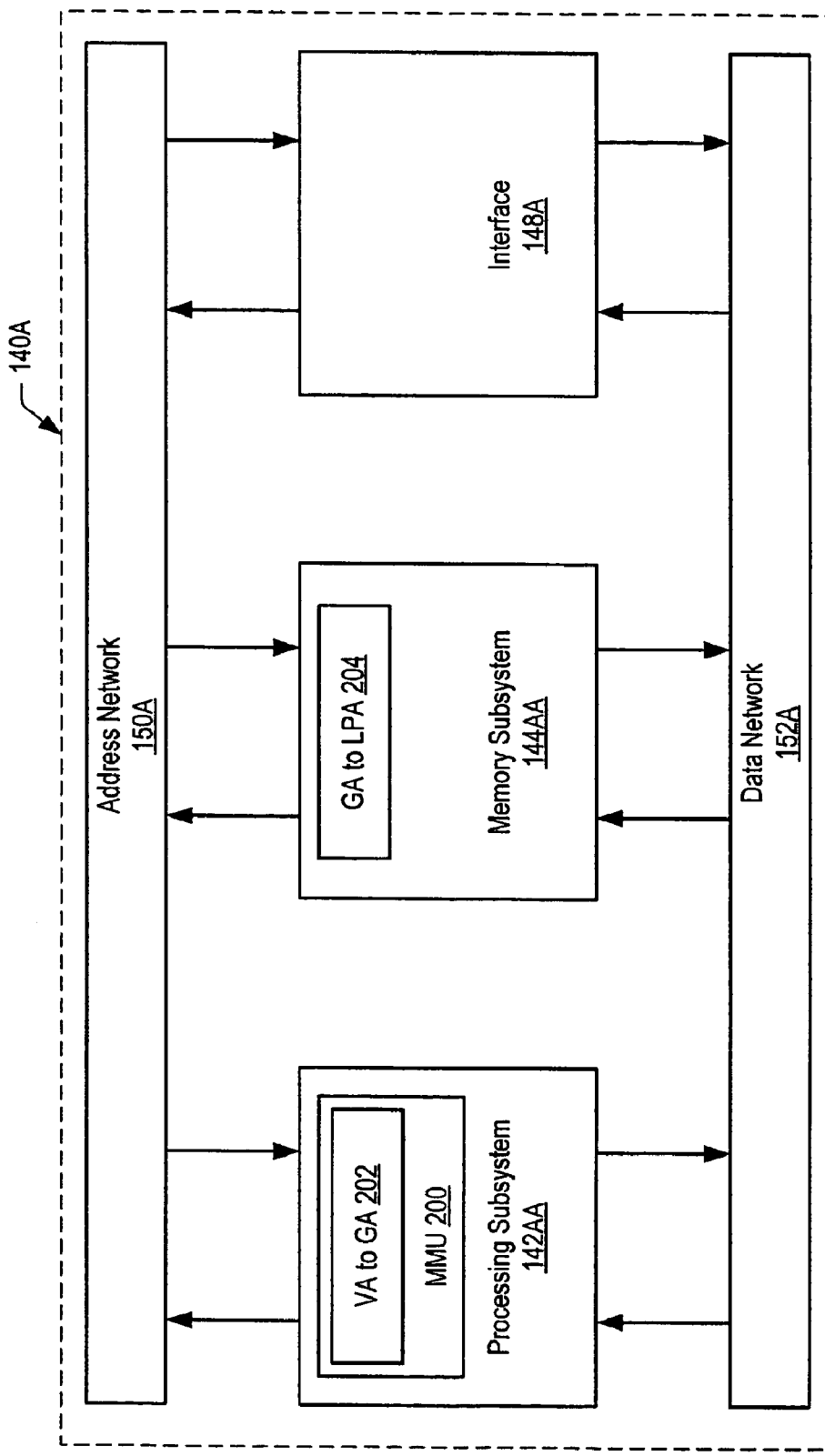
FIG. 2 shows a node within a multiprocessing computer system, according to one embodiment.

FIG. 2 shows a block diagram of a node 140A, according to one embodiment. Note that other embodiments may include different numbers and/or types of devices. As shown, a processing subsystem 142AA may include a memory management unit (MMU) 200. MMU 200 include logic 202 to perform a virtual address (VA) to global address (GA) translation upon the data addresses generated by the instruction code executed upon the processing core of processing subsystem 142AA, as well as the instruction addresses generated by the processing subsystem 142AA. The addresses generated in response to instruction execution are virtual addresses. In other words, the virtual addresses are the addresses created by the programmer of the instruction code. The virtual addresses are passed through an address translation mechanism 202 (embodied in MMU 200), from which corresponding global addresses are generated. MMU 200 may include a TLB (Translation Lookaside Buffer) in which to cache recently accessed translations.

Virtual to global address translation may be performed for many reasons. For example, the address translation mechanism may be used to grant or deny a particular computing task's access to certain global memory addresses. In this manner, the data and instructions within one computing task are isolated from the data and instructions of another computing task. Additionally, portions of the data and instructions of a computing task may be "paged out" from a memory subsystem 144 to a hard disk drive. When a portion of the data is paged out, the translation(s) corresponding to that data are invalidated. Upon access to the paged-out portion by the computing task, an interrupt occurs due to the invalidated translation. The interrupt allows the operating system to retrieve the corresponding information from the hard disk drive. In this manner, more virtual memory may be available than actual memory described in the global address space. Virtual addresses may also be used for other reasons.

The global address computed by MMU 200 defines a location within the global address space associated with computer system 100. Thus, the global address may identify a mapped coherency unit stored within a local memory (e.g., memory subsystem 144AA) or a non-mapped coherency unit stored within a remote memory included in another node. The global address generated by MMU 200 may be used to determine whether the processing subsystem 142AA currently has a copy of the specified coherency unit cached in a local cache. If any coherency transactions are needed to obtain a particular access right to that coherency unit, the processing subsystem 142AA may communicate an address packet that includes the global address on the address network 150A. Other processing subsystems in that node 140A may use the global address to determine whether their caches are currently storing a copy of the coherency unit specified by that global address. For example, each other processing system in node 140A may use at least a portion of the bits of the global address to access a tag array indicating which global addresses are currently cached by that processing subsystem.

In some embodiments, memory subsystem 144AA may be coupled to processing subsystems 142AA by address network 150A, as shown in FIG. 2. In such embodiments, processing subsystem 142AA may request access to a coherency unit stored in memory subsystem 144AA by sending an address packet containing the global address generated by MMU 200 on address network 150A. In alternative embodiments, a memory controller may be integrated with processing subsystem 142AA (e.g., both the memory controller and the processing subsystem may be integrated in a single integrated circuit). In these alternative embodiments, the global address generated by MMU 200 may be provided directly to the integrated memory controller within processing subsystem 142AA without being transmitted in an address packet on address network 150A.

A memory controller included within memory subsystem 144AA may include logic 204 configured to translate the global address generated by the processing subsystem's MMU 200 into a local physical address (LPA). Whenever a global address is received (either from address network 150A or directly from a processing subsystem 144AA with which the memory controller is integrated), the memory controller may input the global address into the GA to LPA logic 204 in order to obtain the corresponding LPA. Some global addresses may not be mapped by memory subsystem 144AA, and these unmapped global addresses may not be translated by GA to LPA logic 204. Memory subsystem 144AA may effectively ignore address packets specifying these unmapped global addresses.

In addition to generating global addresses from virtual addresses, MMU 200 may also generate a set of one or more translation bits for each global address. The translation bits may identify one of various different translation functions that may be used to map a global address into the local physical address space of memory subsystem 144AA (or any other memory subsystem within node 140A). In one embodiment, local physical addresses for which the memory subsystem 144AA is the home memory subsystem may be the same as the global addresses generated by MMU 200. The translation bits generated by MMU 200 for such a global address may indicate that no translation function should be performed on the global address to obtain the local physical address. In other embodiments, a relatively straightforward transformation may relate global address to local physical addresses for which memory subsystem 144AA is the home memory subsystem. For example, in one embodiment, each memory subsystem may remove a portion of the global address or replace a portion of the global address with one or more local address bits. Note that the translation bits corresponding to a particular global address may vary from node to node.

If a particular global address is neither local to nor replicated within the node, the translation bits may indicate that no translation should be performed since there is no local physical address for that global address. A memory subsystem 144 may use these translation bits to determine whether to input a global address to translation logic 204. Similarly, an interface 148A may use these translation bits to determine whether to forward a coherency request to another node. For example, an interface 148A may be configured to always forward coherency requests that specify non-local, non-replicated global addresses, as indicated by the value of the translation bits included in the address packet, to one or more other nodes 140 via inter-node network 154.

In some embodiments, unmapped global addresses may have the same translation function bits as global addresses for which the node is the home node. The memory subsystem 144AA (and/or the interface 148A) may be configured to differentiate unmapped global addresses from mapped global addresses based on the global address range in which each global address is included. For example, the memory subsystem 144AA may track which portions of the global address space are currently mapped to that memory subsystem and use the tracked information to differentiate mapped and unmapped global addresses. In other embodiments, different translation bits may be used to distinguish mapped addresses from unmapped addresses.

If a particular global address has been replicated within memory subsystem 144AA and memory subsystem 144AA is not the home node, one of various different translation functions may have been used to map that global address to a local physical address within the memory subsystem 144AA. The translation bits generated by MMU for that global address may identify the particular translation. The GA to LPA logic 204 included in memory subsystem 144AA may use these translation bits to select the appropriate translation function to apply to the global address in order to obtain the local physical address.

Figure 3:
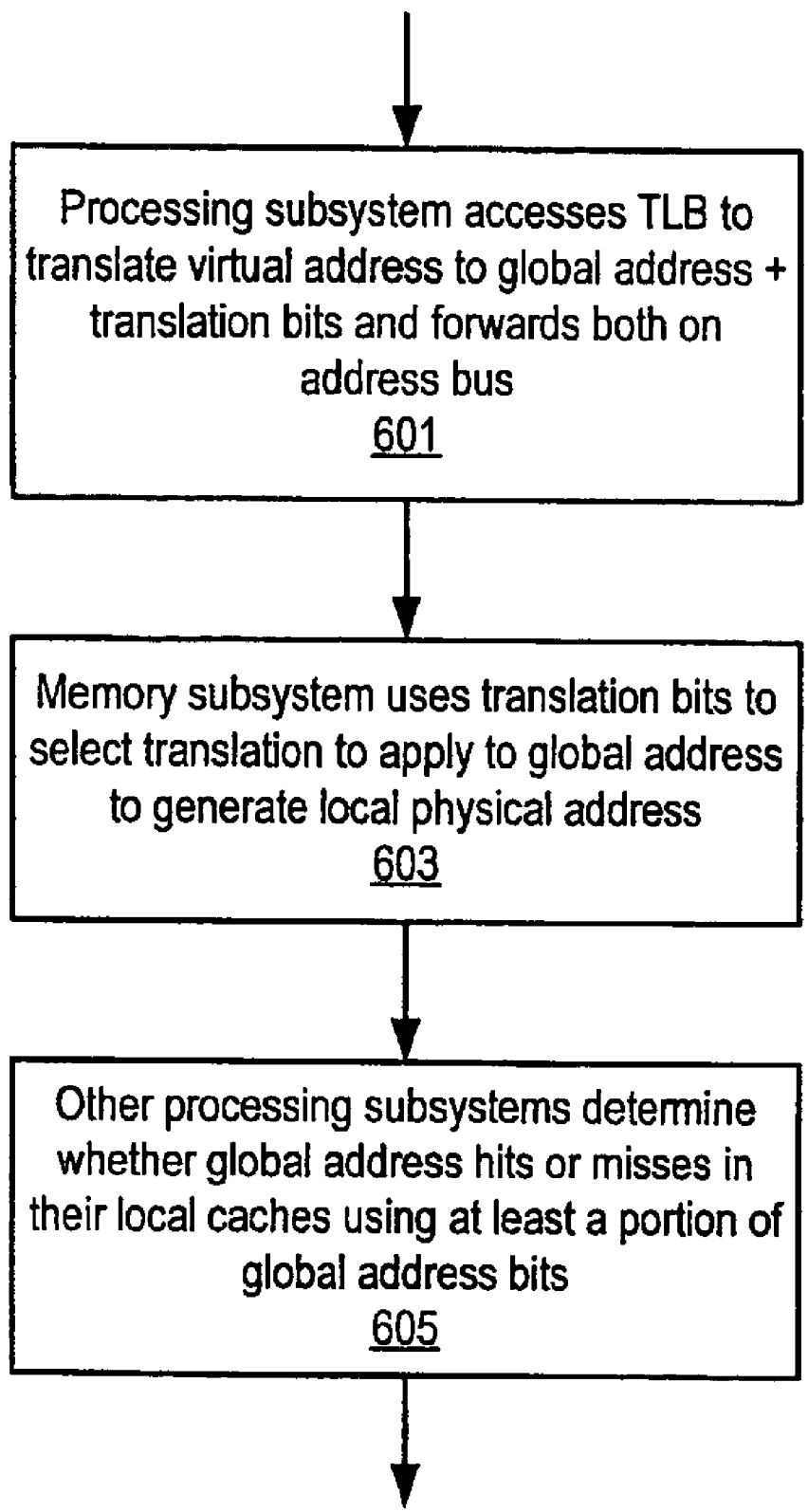
FIG. 3 is a flowchart of a method of performing an intra-node coherency transaction, according to one embodiment.

FIG. 3 illustrates one embodiment of a method of operating a multi-node computer system. At 601, a processing subsystem accesses the processing subsystem's translation lookaside buffer to translate a virtual address to a global address. Accessing the translation lookaside buffer may retrieve a global address and one or more bits identifying a translation function associated with the virtual address. The processing subsystem may encode both the global address and the bits identifying the translation function into an address packet and forward the address packet on the address network (e.g., in order to initiate a coherency transaction for that coherency unit). A memory subsystem that maps the global address may use the bits identifying the translation function to select which translation to apply to the global address in order to obtain the local physical address of the coherency unit within that memory subsystem, as shown at 603. The memory subsystem may then use the local physical address to access the specified coherency unit in memory. Other processing subsystems may use the global address to detect whether they are currently caching a copy of the coherency unit specified by the global address, as shown at 605.

Figure 4:
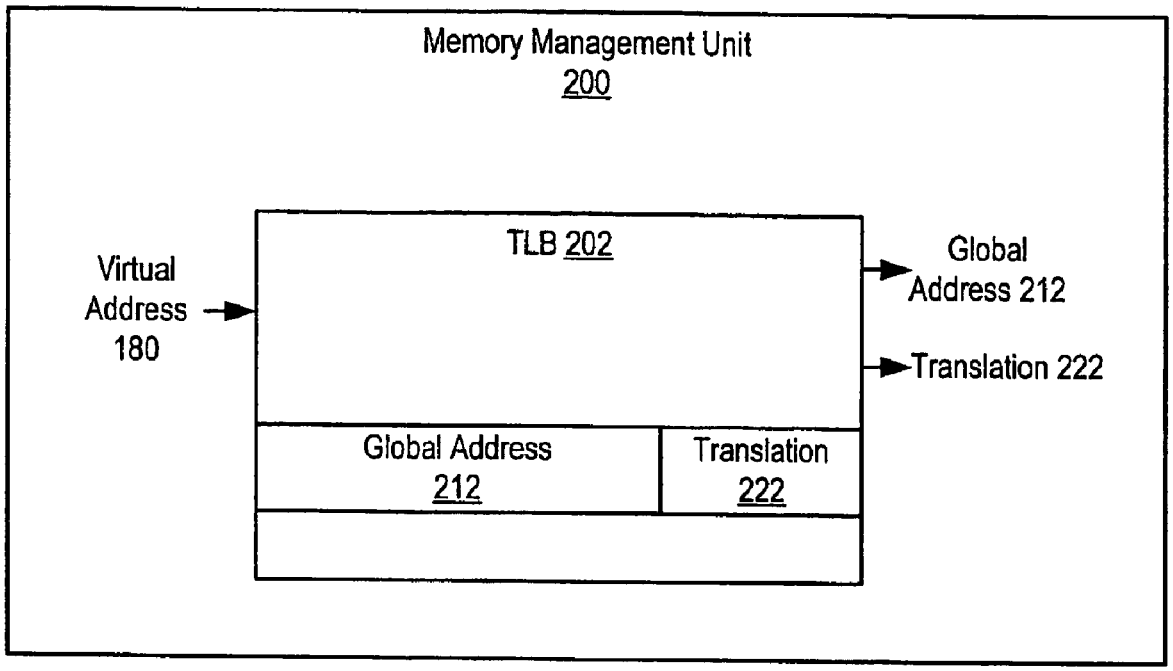
FIG. 4 illustrates a processing device that includes a virtual-to-global address translation table, according to one embodiment.

FIG. 4 illustrates an exemplary MMU 200, according to one embodiment. Here, the MMU 200 includes a translation lookaside buffer (TLB) 202 used to translate virtual addresses generated within a processor 142 into global addresses. The TLB may include several entries, each of which may include a global address 212 and a translation 222. Note that in many embodiments, only a portion (e.g., the base address of a page) of the global address 212 may be actually stored in TLB 202. The TLB 202 may use a portion of the virtual address to select the appropriate TLB entry and combine the portion of the global address 212 stored in that entry with a portion (e.g., a page offset) of the virtual address to generate the total global address 212. Additionally, the TLB entry may output a translation 222 corresponding to that global address. The translation 222 may be a set of one or more bits identifying a translation function (e.g., a hashing function or other manipulation) to be applied to the global address to generate the local physical address (LPA) within that node. If there is no corresponding LPA within that node, the translation bits 222 may indicate that the global address is not mapped to the node and/or that no translation should be applied to that global address. The memory subsystem 144 may in turn be configured to detect whether it maps such an address by comparing the global address to one or more ranges of mapped global address and/or by identifying the global address as an unmapped address in response to the value of the translation bits 222.

Translation information may be cached in a TLB entry in the TLB 202 in response to the translation information being used to translate a virtual address. The information may be more permanently stored in page tables within memory (e.g., included in memory subsystem 144AA). The page tables may be created by an operating system executing on one or more of the processing subsystems 142. The instructions implementing the operating system may themselves also be stored in a memory subsystem 144. Note that the same page table structure and TLB structure may be used to map both mapped and unmapped addresses.

For replicated global addresses, the operating system may select which translation function to use to map that global address into the local physical address space dependent on which portions of local physical address space are currently available to be mapped to replicated addresses. The portion(s) of local physical address space available to map replicated addresses may be effectively handled as an associative cache into which replicated addresses may be mapped in some embodiments. The available range into which certain global addresses may be mapped may be limited. For example, certain translation functions may not uniquely map the entire range of non-home global addresses to unique LPAs; the operating system may not use such a translation function to translate any of the non-home global addresses that translation function is not capable of mapping to a unique LPA. The decision as to whether to replicate or not replicate a particular non-home global address may be made on a per-node basis (e.g., based on one or more criteria such as current access patterns, user-selected constraints, performance impact, etc.).

In some embodiments, the set of available translation functions may allow any LPA (other than those allocated to home addresses) to be mapped to any GA. In other embodiments, a more limited set of translation functions may be available (e.g., in order to limit the number of translation bits 222 required to uniquely identify one of the translation functions), which may in turn restrict the set of LPAs to which a particular GA may be mapped. For example, in one embodiment, sixteen or fewer translation functions may be available, allowing any translation function to be identified using four translation bits 222.

Figure 5A:
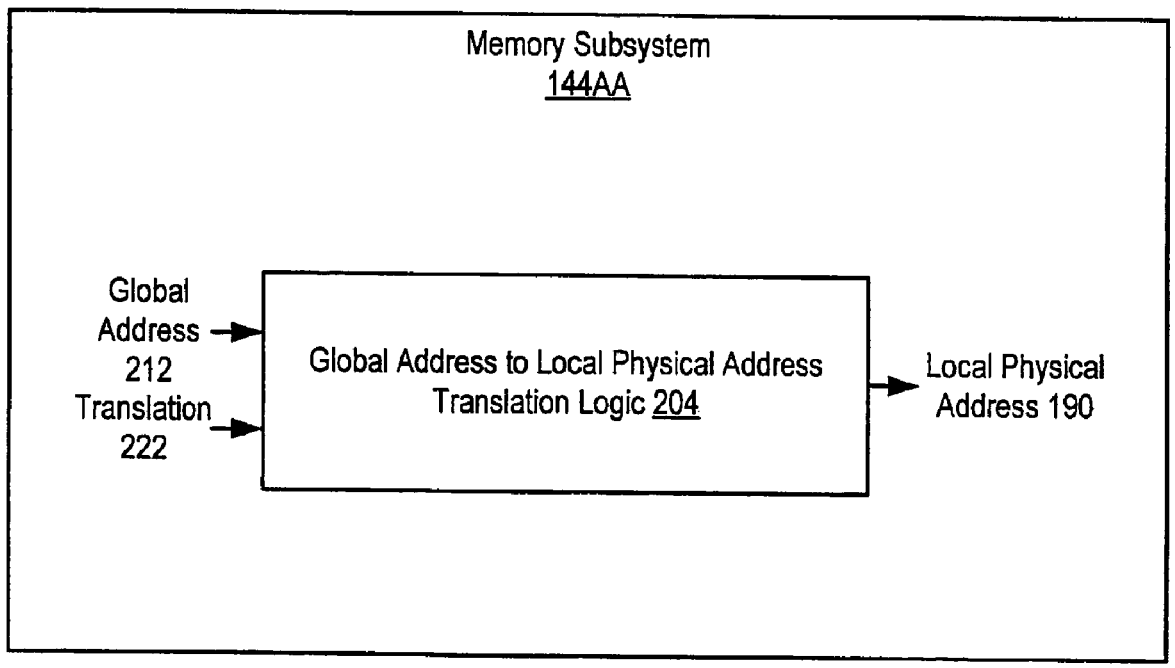
FIG. 5A illustrates a memory device that includes a global-to-local physical address translation table, according to one embodiment.

FIG. 5A illustrates the logic 204 included in a memory subsystem 144AA that may be used to translate a global address to a local physical address. The GA to LPA translation logic 204 may receive the global address and the translation bits 222. Depending on which translation function, if any, is identified by the translation bits 222, the translation logic 204 selectively uses that translation function to modify at least a portion of the global address to generate the local physical address 190. For example, as with the TLB translation, only a portion of each global address may be translated to generate the local physical address. The un-translated portion (e.g., a page offset) may then be concatenated with the translated portion to generate the local physical address. Note that in other embodiments, however, the entire global address may be translated to generate the local physical address. After the translation function is applied to the global address, the resulting local physical address may be used to perform an access to a memory device included in the memory subsystem 144AA.

Due to the ability of active devices to access data in multiple nodes, there is a possibility that a coherency unit may be cached in any node. The coherency protocol may support coherency transactions involving more than one node. In order to communicate effectively with active devices in other nodes, each active device may use global addresses to specify coherency units. However, since each node may use a different translation to map a global address to local address space, the translation 222 associated with each global address in each node that is replicating that global address may also be necessary to be able to access the coherency unit in the mapping memory subsystem in each replicating node.

Figure 5B:
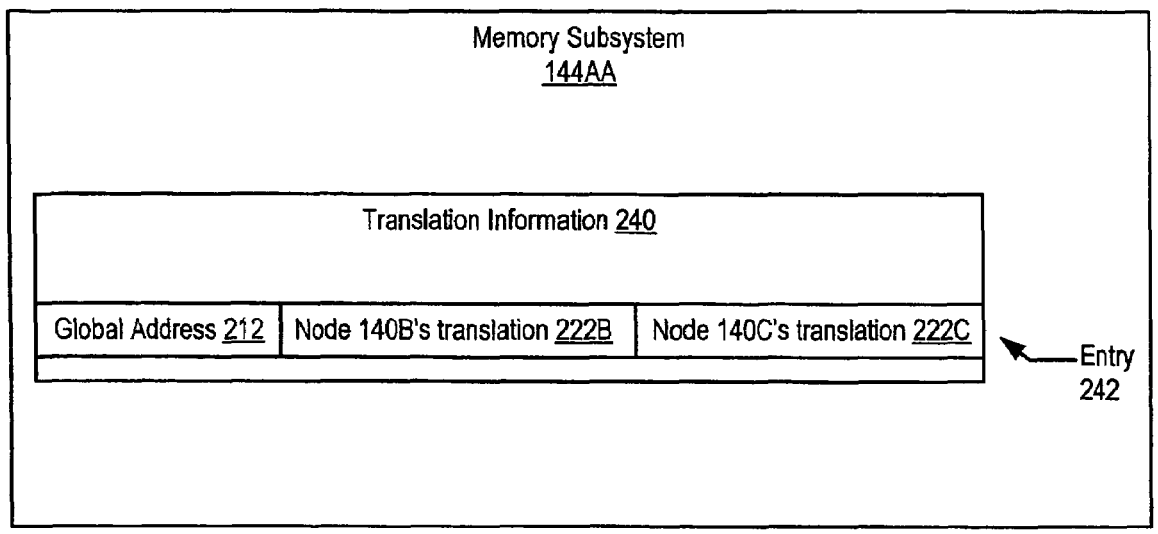
FIG. 5B illustrates a memory device that stores translation information used in other nodes that are replicating a particular coherency unit, according to one embodiment.

Translation information 222 for at least some of the nodes 140 that replicate a coherency unit may be stored by the home memory subsystem for that coherency unit. For example, the home memory subsystem for a coherency unit may store information identifying which nodes currently replicate that coherency unit and which translation function each replicating node uses to map that coherency unit's global address into the replicating node's local address space, as shown in FIG. 5B. FIG. 5B shows exemplary information 240 memory subsystem 144AA may store for a coherency unit whose home memory subsystem is memory subsystem 144AA. The memory subsystem 144AA may store the information 240 in memory (e.g., RAM) or in a separate cache or metadata storage. In some embodiments, the information may be stored in a table indexed by all or part of the global address 212 of each coherency unit for which that node is the home node. Alternatively, the information may be indexed or stored according to local physical address. For each home coherency unit, the memory subsystem 144AA may store information identifying the translations 222 used in each node that replicates that coherency unit. FIG. 5B shows an exemplary entry 242 in a translation information table 240 for a coherency unit that is replicated in nodes 140B and 140C. The entry 242 includes a translation 222B for node 140B and a translation 222C for node 140C.

In some embodiments, if a coherency transaction involves multiple nodes, a packet indicating the coherency transaction may be sent to the home node for the specified coherency unit. The interface 148 in the home node may then provide a packet indicating the coherency transaction to the coherency unit's home memory subsystem. If replicating nodes other than the home node and the initiating node need to participate in the coherency transaction, the home memory subsystem may send the interface 148 in the home node the translation information 222 associated with each other replicating node whose participation is required in the coherency transaction. The interface 148 may provide these replicating nodes with a packet indicating the desired coherency activity to be performed in each node. The node-specific translation information 222 associated with each node may also be included in that packet, allowing the specified coherency unit to be accessed in the local physical address space of each replicating node.

In embodiments in which the home memory subsystem maintains the translation information for each replicating node, the interfaces 148 may not need to maintain this translation information. Interfaces 148 may also avoid performing any translations on addresses when communicating with other nodes. Accordingly, in these embodiments, interfaces 148A and 148B may not need to store translation bits 222 for coherency units replicated in the interfaces' respective nodes (or, alternatively, for coherency units whose home nodes are the interfaces' respective nodes). In such embodiments, the global address 212 and translation bits 222 output by an interface 148 are the same as the global address 212 and translation bits 222 received by that interface 148. In other words, no address translation may be performed within the interface 148, either before sending packets on the local address network or before sending packets on the inter-node network 154. In some embodiments, if other metadata (e.g., directory information) is already being looked up for the coherency unit in the home memory subsystem, retrieving the translation information from the home memory subsystem may not add significant latency to the coherency transaction. Note that alternative embodiments may instead store node-specific global to local physical address translation information in interfaces 148 instead of in memory subsystems 144. For example, instead of storing translation information for each replicating node in the home memory subsystem, the translation information for each replicating node may be stored in that node's interface(s) 148. When packets involved in coherency transactions are received from other nodes via inter-node network 154, the interface 148 in a replicating node may append the node-specific translation information for the specified coherency unit in the replicating node and provide that information on the node's address network.

Figure 6A:
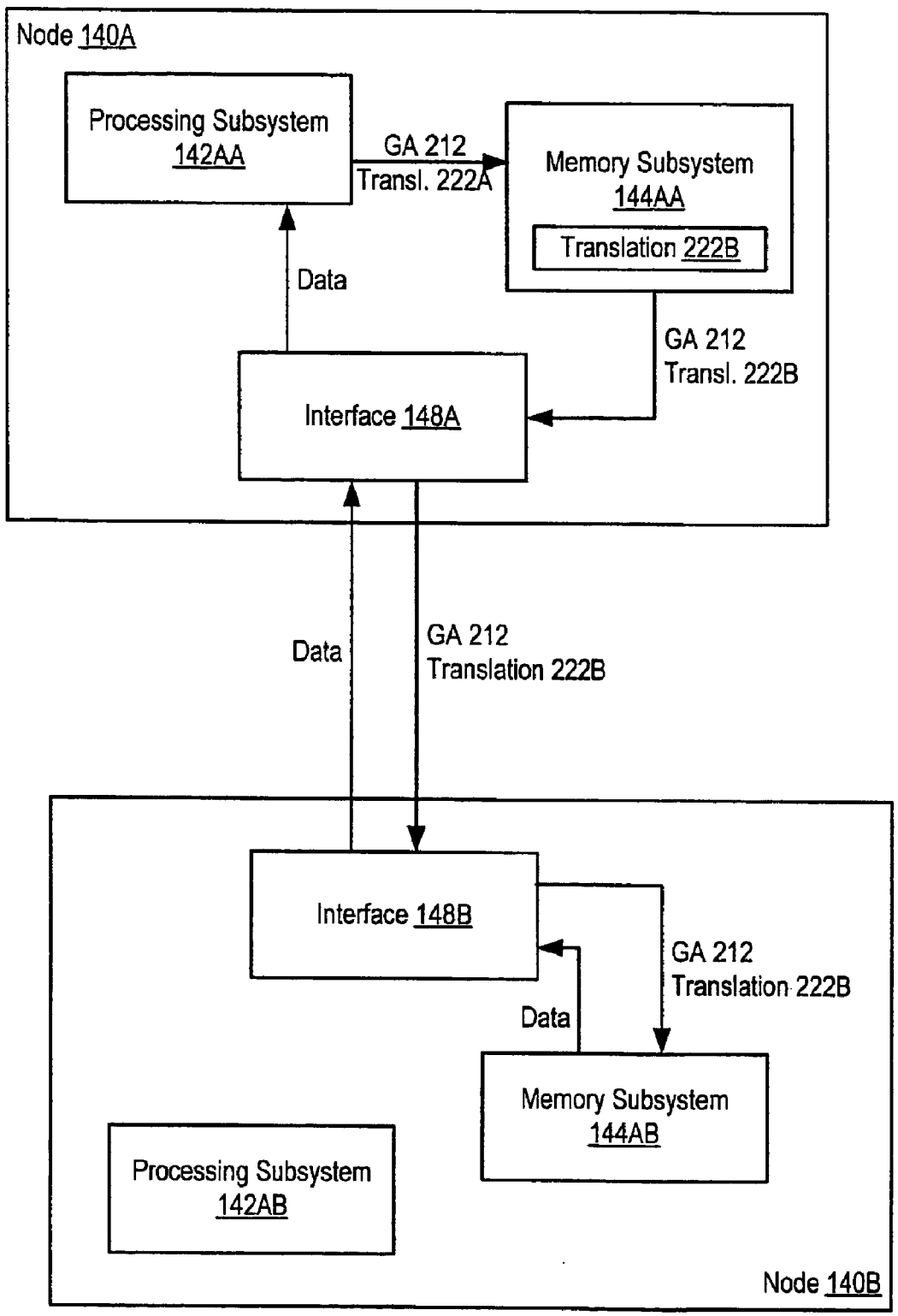
FIG. 6A shows an exemplary set of address translations that may be performed in a multi-node system, according to one embodiment.

FIG. 6A illustrates how virtual, global, and local physical addresses may be generated and transmitted within various part of computer system 100. Two exemplary nodes 140A and 140B are illustrated in FIG. 6A. One node 140A is the home node for a particular coherency unit. Accordingly, a memory subsystem 144AA included in node 140A maps that coherency unit. In other words, a copy of that coherency unit is stored at a local physical address within the local physical address space corresponding to memory subsystem 144AA. Additionally, a memory subsystem 144AB in another node 140B replicates that coherency unit. Note that while memory subsystems 144AA and 144AB may each map the coherency unit to a different local physical address, the same global address 212 is used to identify the coherency unit within both nodes 140A and 140B.

When the coherency unit is replicated in node 140B, the home memory subsystem 144AA for that coherency unit may store information indicating that the coherency unit is replicated in node 140B. The home memory subsystem 144AA may also store the translation bits 222B identifying which translation is used to map the coherency unit's global address 212 to a local physical address in memory subsystem 144AB. This information may be generated and stored by the operating system that decides to replicate the coherency unit during the replication process.

In this example, a processing subsystem 142AA initiates a coherency transaction to request an access right for the coherency unit that is replicated in node 140B. As part of a coherency transaction, the coherency unit may need to be obtained from node 140B and the various devices' access rights to that coherency unit may need to be modified. For example, a device in node 140B may have write access to the coherency unit, and processing subsystem 142AA may need to obtain a copy of that coherency unit from the device with write access in order to have the most up-to-date copy of that coherency unit. Processing subsystem 142AA may also need to modify the other device's access right (e.g., to a shared access right, if processing subsystem 142AA is requesting shared access) as part of the coherency transaction.

When processing subsystem 142AA initiates a coherency transaction to gain an access right to the coherency unit, processing subsystem 142AA may output the global address 212 and translation 222A associated with that coherency unit in an address packet. A different translation function may be used to map the global address identifying that coherency unit into memory subsystems 144AA and 144AB, and thus the translation 222A may differ from a translation 222B associated with global address 212 in node 140B. If the address packet is broadcast to all of the client devices within the node, any other processing subsystems 142 within node 140A may each use the global address to determine whether that processing subsystem has a cached copy of the coherency unit. Memory subsystem 144AA may receive the address packet via the address network of node 140A and determine whether any inter-node coherency activity is required to complete the coherency transaction. If, for example, memory subsystem 144AA earlier received an indication that a device in node 140B requested write access to the coherency unit, memory subsystem 144AA may determine that node 140B may have a more recently updated version of the coherency unit that should be provided to processing subsystem 142AA as part of the coherency transaction. Accordingly, memory subsystem 144AA may determine that the coherency transaction may not be completed without the involvement of node 140B.

In response to determining that node 140B's involvement is needed to complete the coherency transaction, memory subsystem 144AA may provide the translation 222B used to map that global address 212 to node 140B's local physical address space to interface 148 for communication to node 140B. Interface 148B may responsively communicate a packet to node 140B via the inter-node network indicating the coherency transaction, the global address 212, and the translation 222B. In some embodiments, the home memory subsystem 144AA may cause interface 148B to send a packet to node 140B by forwarding the address packet sent by processing subsystem 142A to interface 148B upon determining that the coherency transaction cannot be completed within node 140A. Before sending the address packet to interface 148A, memory subsystem 144AA may replace the translation bits 222A with 222B or append translation bits 222B to the packet generated by processing subsystem 142A. Alternatively, interface 148B may send a packet requesting the appropriate translation bits 222B for global address 212 to memory subsystem 144AA in response to receiving the address packet sent by processing subsystem 142AA. In response to memory subsystem 144AA returning the translation 222B for that global address 212, the interface 148A may send a packet on the inter-node network to node 140B containing the global address 212, the translation 222B, and an indication of the coherency transaction.

Interface 148B may include the global address 212, translation 222, and indication of the requested coherency activity received from node 140A in an address packet sent on the address network within node 140B. If this packet is broadcast, processing subsystems such as processing subsystem 142AB may use the global address 212 to determine whether a copy of the coherency unit is stored in that processing subsystem's cache. When memory subsystem 144AB receives the packet, memory subsystem 144AB may identify the client device in node 140B that should respond to the address packet. For example, if memory subsystem 144AB has ownership of the specified coherency unit, the memory subsystem 144AB may respond by sending a copy of the requested coherency unit and/or by modifying an access right or responsibility associated with that coherency unit. If the memory subsystem 144AB is responding by sending a copy of the specified coherency unit, as shown in FIG. 6A, memory subsystem 144AB may use the translation bits 222B (provided by memory subsystem 144AA) to select which translation function to apply to global address 212 in order to obtain the local physical address of the coherency unit. Upon obtaining the local physical address, memory subsystem 144AB may access the coherency unit in memory and return a copy of the coherency unit to the requesting node 140A via interface 148B.

Figure 6B:
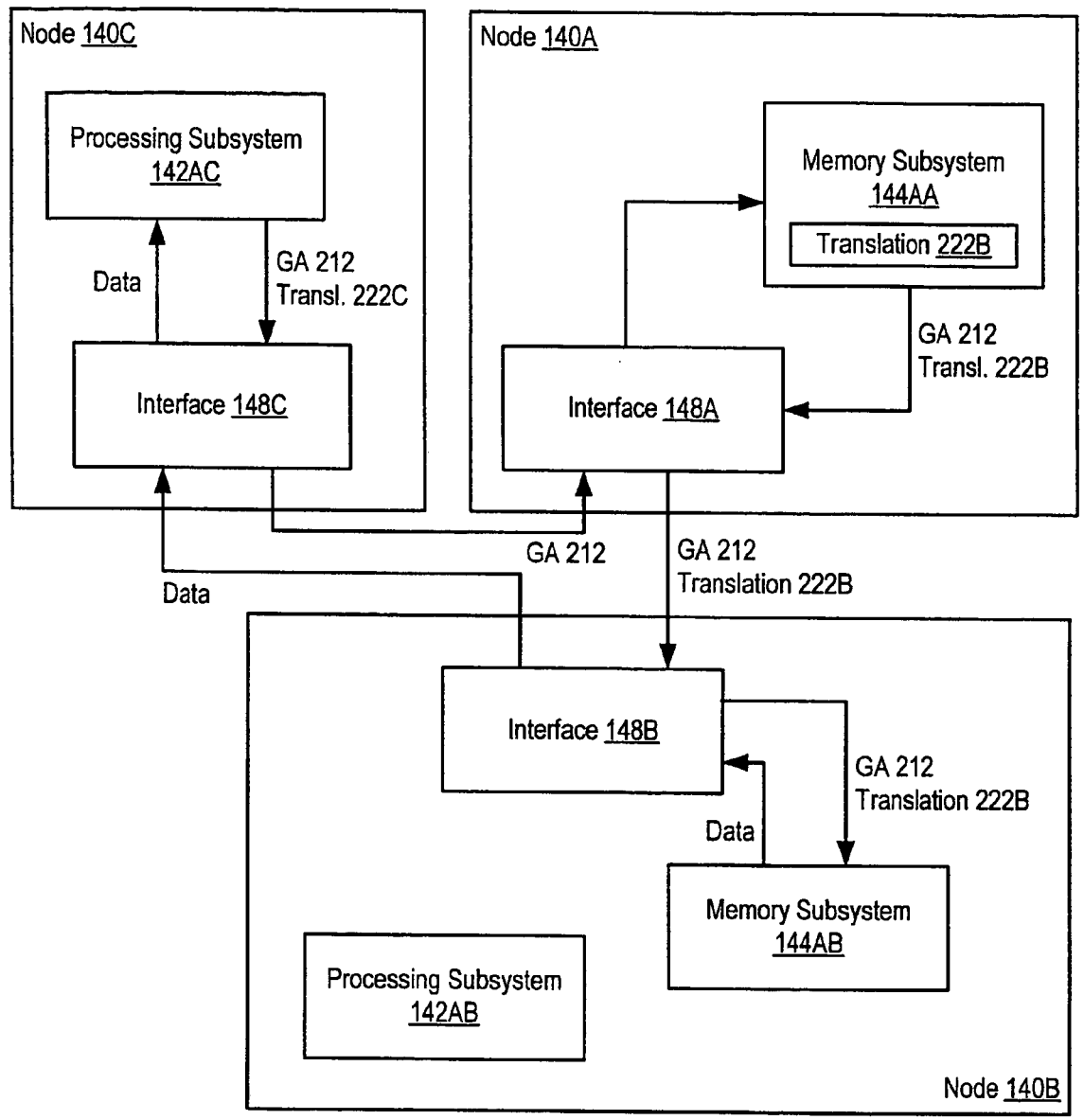
FIG. 6B shows another exemplary set of address translations that may be performed in a multi-node system, according to one embodiment.

FIG. 6B illustrates a similar coherency transaction initiated in a node 140C that is neither the home node 140A nor a replicating node 140B for the requested coherency unit. Here, a processing subsystem 142AC in node 140C initiates a coherency transaction for a coherency unit by outputting the coherency unit's global address 212 on node 140C's address network. Since the coherency unit is not replicated within node 140C, the translation bits 222C generated by processing subsystem 142AC may indicate that the coherency unit is not replicated and/or that no translation is needed. Assuming that no active device in node 140C can perform the necessary data transfers, access right transitions, and/or ownership transitions to complete the coherency transaction, interface 148C may forward a packet indicating the global address 212 and the requested coherency transaction to the home node 140A.

Once the request is forwarded to the home node 140C, the coherency transaction may proceed similarly to that shown in FIG. 6A. If the home node can satisfy the coherency transaction, the interface 148A in the home node 140A may return a copy of the requested coherency unit to the initiating node 140C. If the home node 140C cannot satisfy the coherency transaction, the home node may forward the request to another node that can satisfy the coherency transaction. In this example, the home node 140C forwards the request to a node 140B that is replicating the specified coherency unit. The home node includes the global address 212 and the translation bits 222B associated with node 140B in the coherency request forwarded to node 140B. As in FIG. 6A, the memory subsystem 144AB may use the translation bits 222B to obtain the local physical address of the specified coherency unit. The memory subsystem 144AB may then return a copy of the specified coherency unit to the requesting node 140C via interface 148B.

Figure 7:
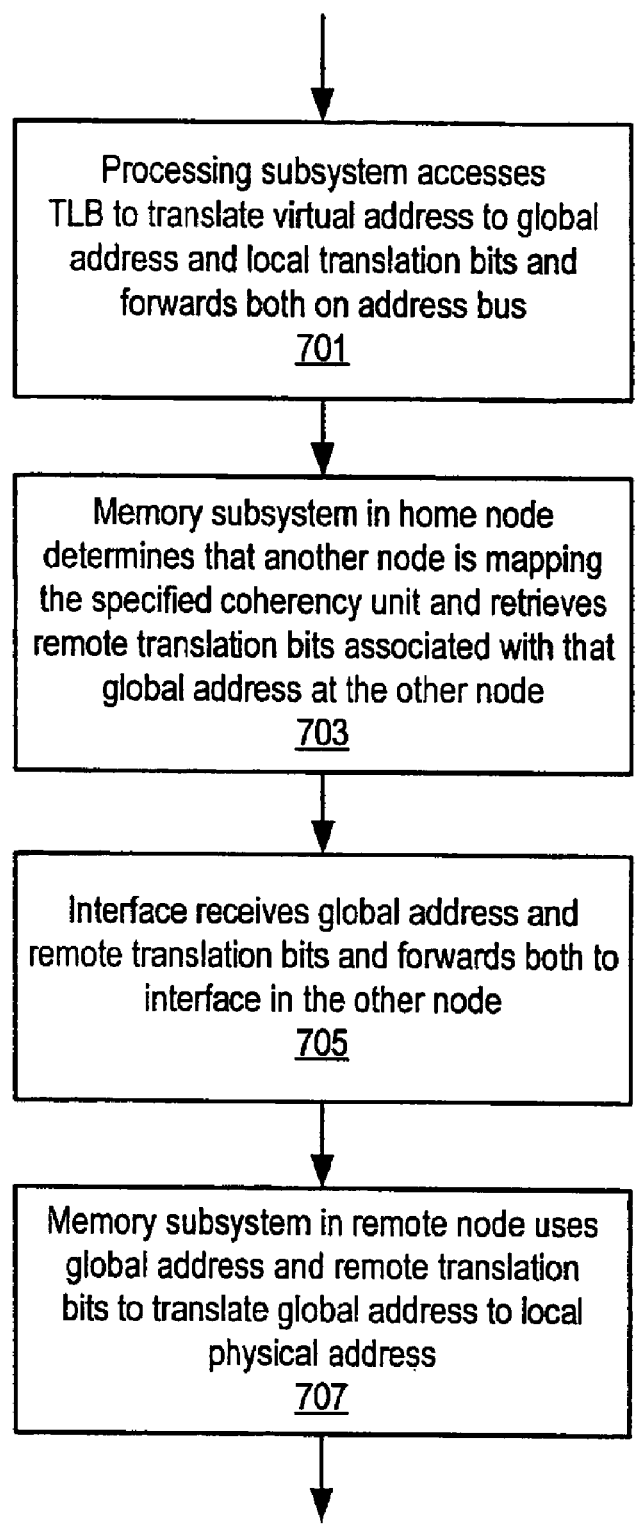
FIG. 7 is a flowchart of a method of performing an coherency transaction involving multiple nodes, according to one embodiment.

FIG. 7 shows another flowchart of a method of operating a multi-node computer system, according to one embodiment. At 701, a processing subsystem accesses its TLB to translate a virtual address to a global address and to obtain local translation bits associated with that global address. The processing subsystem forwards both the global address and the local translation bits in an address packet on a local address network. Other processing subsystems in the same node as that processing subsystem may use the global address to determine whether the specified coherency unit is locally cached by those processing subsystems. The memory subsystem in the home node that maps the coherency unit identified by the global address generated at 701 may determine that another node is mapping the specified coherency unit. If the other node's participation in the coherency transaction is needed, the home memory subsystem may retrieve remote translation bits associated with that global address at the other node, as shown at 703. Note that each different node may associate a different set of translation bits with the same global address. In other words, each node may use a different translation function to map the same global address to a different local physical address.

The home memory subsystem may provide the global address and the remote translation bits to an interface to the other node. As shown at 705, the interface receives the global address and remote translation bits and forwards both to an interface in the other node. A memory subsystem in the other node uses the remote translation bits to select which translation function to apply to the global address, as indicated at 707. By applying the selected translation to the global address, the remote memory subsystem generates the appropriate local physical address within the local physical address space of that node.

Figure 8:
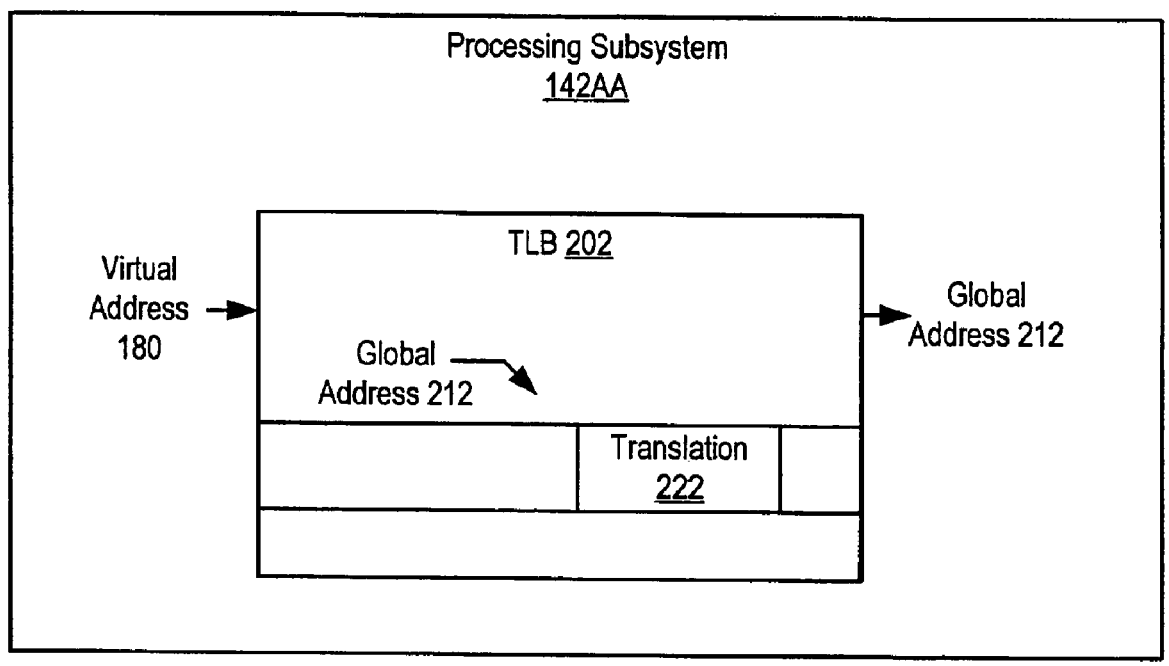
FIG. 8 shows an exemplary translation lookaside buffer entry, according to one embodiment.

In some embodiments, the translation information may be part of the global addresses generated by active devices, as opposed to being handled as a separate piece of address information as described above. FIG. 8 illustrates an exemplary processing subsystem 142 that may be included in such an embodiment. Here, the processing subsystem 142 includes a TLB 202. Each TLB 202 entry may include a global address 212. A portion 222 of the bits in the global address may indicate the translation function associated with that global address. Since each node may use a different translation function to map a given global address into local physical address space, the portion 222 of the global address 212 that identifies the translation function may vary among nodes. Active devices may use some of the global address bits that are used to specify local translations for certain global addresses to determine whether a copy of the specified coherency unit is locally cached.

In some embodiments, certain global addresses may be replicable while others may not. One bit of the global address (e.g., the highest order bit) may indicate whether that global address is replicable. If the address is not replicable, the portion 222 of the global address 212 that would otherwise be used to store translation bits may instead be used as normal address bits. Accordingly, the range of addressable global address space allocated to non-replicable global addresses may be larger than the range of addressable global address space allocated to replicable global addresses.

By using a portion 222 of the global address itself to specify the translation function, a portion of the global address space may effectively go unused. For example, in one embodiment, the value of the highest order bit in a 47-bit global address 212 may indicate whether an address is replicable or not. If an address is replicable, the next three highest order bits may be used to specify the translation function used within that node for that global address. If the address is not replicable, the next three highest order bits may instead be used to specify the address. The local memory in the node may use the same translation function to handle all non-replicable addresses mapped to that memory, so translation information may not be necessary for these addresses. Similarly, if a non-replicable address does not map to any memory within the node, no translation information is necessary since the coherency unit will need to be retrieved from its home node. In such an embodiment, the use of four (out of 47) address bits to specify translation information (three bits to indicate the translation function, one bit to indicate whether replicable) for replicable global addresses may reduce the effective global address space by 7/16ths.

In embodiments in which local translation identifiers are treated as part of global addresses, the home memory subsystem for a given replicable coherency unit may store the portion 222 of the global address used to identify that coherency unit in each node that is currently replicating that coherency unit. If multiple nodes are replicating a given coherency unit, the home memory subsystem may track multiple different translation portions 222 of the coherency unit's global address. The home memory subsystem may substitute the appropriate remote translation bits into the global address or otherwise provide the translation bits to the interface in the home node for transmission as part of the global address in a packet sent to the remote node. Accordingly, the interface may not need to store this translation information for each replicating node and coherency transactions may be implemented similarly to the examples of FIGS. 6A-6B. In turn, the interface may simply forward the addressing information it receives without needing to perform any addressing translations when communicating between nodes.

Figure 9:
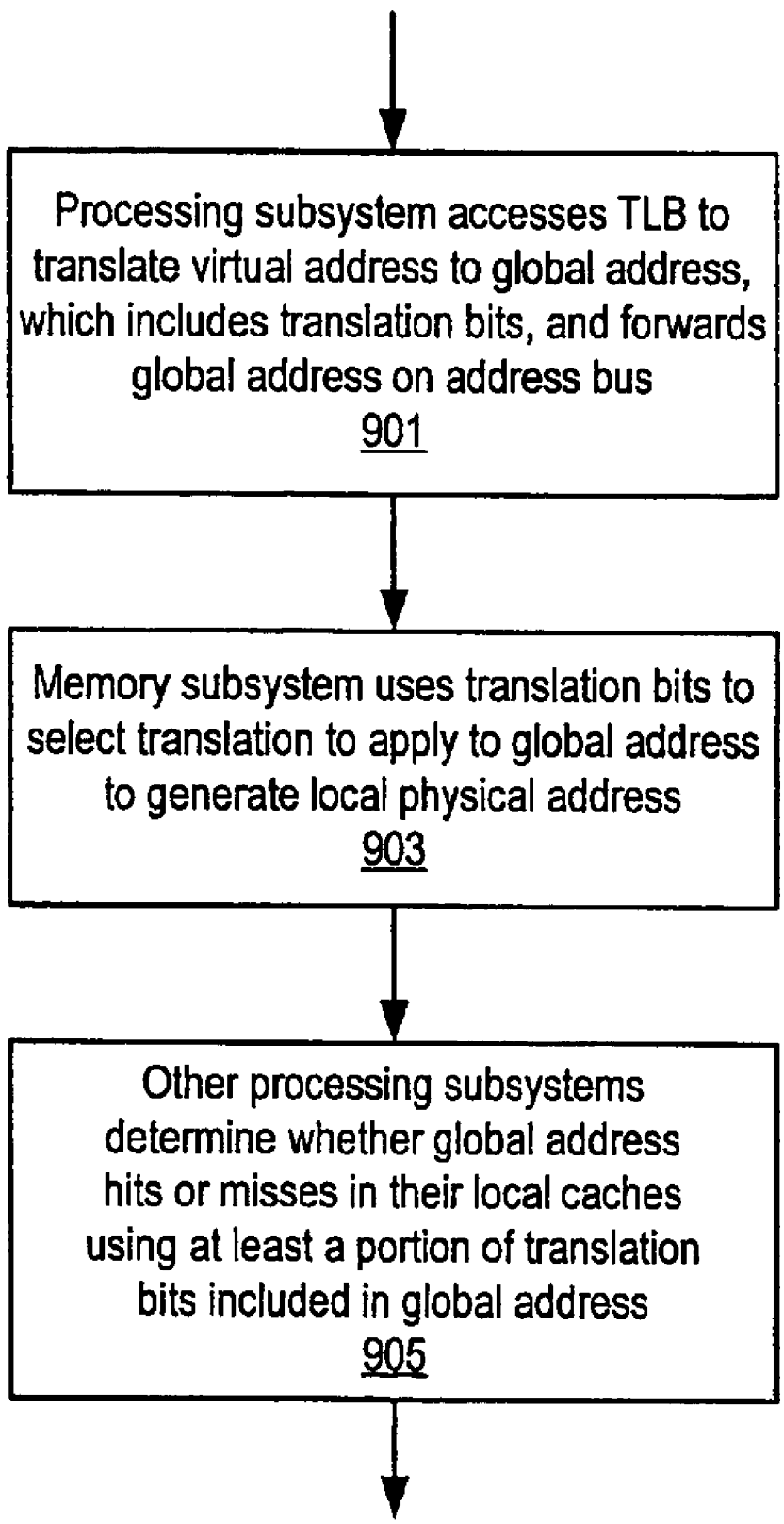
FIG. 9 is a flowchart of another embodiment of a method of performing an coherency transaction within a node of a multi-node computer system.

FIG. 9 is a flowchart of a method of performing address translations in a multi-node system, according to one embodiment. At 901, a processing subsystem translates a virtual address to a global address, which includes one or more translation bits identifying a translation function, and forwards the global address on address bus. The address translation may be performed by accessing a TLB. Each processing subsystem in the multi-node system may be configured to perform similar address translations. In some embodiments, certain global addresses may not include translation bits. For example, certain global addresses may not be replicable in more than one node. One bit of global address information may identify whether that global address is replicable or not. If a global address is not replicable, the memory subsystem in the home node for that global address may be configured to either not perform any address translation or to perform the same address translation on all home global addresses to obtain the local physical address. Accordingly, it may be unnecessary to specify any translation function in such a global address and the bits that would otherwise be used to specify a translation function may instead be used to specify addresses within an otherwise non-addressable portion of the global address range. If a global address is replicable, a portion of the global address may be used to specify which translation function should be used to translate that global address to a local physical address in a particular node. Note that different nodes may use different translation functions to translate the same global address, and thus the translation function portion of the global address may differ from node to node.

At 903, a memory subsystem uses the translation bits to select which translation to apply to the global address to generate a local physical address. The local physical address locates the specified data within that memory subsystem. The processing subsystem that generates the global address at 901 may provide the global address to the memory subsystem directly (e.g., if the processing subsystem and memory controller are both implemented in a single integrated circuit) or via the node's address network.

The processing subsystem that performs the address translation at 901 may output an address packet containing the global address on its node's address network in order to initiate a coherency transaction. Other processing subsystems in the same node may receive the address packet from the address network and use the global address, including at least some of the bits that are used to specify the translation function, to determine whether a copy of the coherency unit identified by that global address is locally cached. Thus, unlike the implementation described with respect to FIG. 3 in which the bits used to specify the translation may not be used when looking up a global address in a cache, at least some of the translation function bits may be used when determining whether the global address hits or misses in a local cache.

Numerous variations and modifications will become apparent to those skilled in the art once the above disclosure is fully appreciated. It is intended that the following claims be interpreted to embrace all such variations and modifications.

What is claimed is:

1. A system, comprising;
a plurality of nodes, wherein each node comprises an active device and a memory subsystem coupled to the active device; and
a memory management unit comprising global address and translation function information included in the active device of one of the plurality of nodes, wherein the memory management unit is configured to provide the global address and translation function information in response to a virtual address;
wherein the memory subsystem in the one of the plurality of nodes is configured to translate the global address to a local physical address by selecting a translation function from a plurality of translation functions depending upon the translation function information and by performing the selected translation function on the global address;
wherein a value of the translation function information indicates whether any memory subsystem included in the one of the plurality of nodes is a home memory subsystem for the global address;
wherein any coherency transaction that involves multiple ones of the plurality of nodes involves the home memory subsystem for the coherency unit corresponding to the coherency transaction.

2. The system of claim 1, wherein active devices included in different ones of the plurality of nodes are configured to generate translation function information identifying different translation functions for a same global address.

3. The system of claim 1, wherein each active device in a same one of the plurality of nodes is configured to generate identical translation function information identifying the translation function for a same global address.

4. The system of claim 1, wherein the active device included in the one of the plurality of nodes is configured to output the global address in an address packet on an address network coupling the active device to an additional active device within the one of the plurality of nodes in order to initiate a coherency transaction for a coherency unit identified by the global address.

5. The system of claim 4, wherein in response to receiving the address packet from the address network, the additional active device included in the one of the plurality of nodes is configured to use the global address to determine if the additional active device has a cached copy of the coherency unit.

6. The system of claim 5, wherein the additional active device is configured to not use any of the translation function information to determine if the additional active device has the cached copy of the coherency unit.

7. The system of claim 4, wherein the one of the plurality of nodes includes an interface configured to couple that node to other ones of the plurality of nodes;
wherein the interface is configured to participate in the coherency transaction by conveying the global address included in the address packet to at least one of the oilier ones of the plurality of nodes.

8. The system of claim 7, wherein if the memory subsystem determines that the coherency transaction cannot be completed within the one of the plurality of nodes, the memory subsystem is configured to provide the global address to the interface for conveyance to the at least one of the other ones of the plurality of nodes.

9. The system of claim 7, wherein a memory subsystem included in the at least one of the other ones of the plurality of nodes is configured to apply a different translation function to the global address received via the interface to generate a local physical address of the coherency unit within the at least one of the other ones of the plurality of nodes.

10. The system of claim 1, wherein a memory controller included in the memory subsystem is integrated in a same integrated circuit as the active device.

11. The system of claim 1, wherein a value of the translation function information indicates whether any memory subsystem included in the one of the plurality of nodes currently maps the global address.

12. The system of claim 1, wherein the value of the translation function information indicates that the one of the plurality of nodes includes the home memory subsystem for the global address by identifying a translation function used to translate all global addresses having a home memory subsystem in the one of the plurality of nodes.

13. A method for use in a system comprising a plurality of nodes, wherein each of the plurality of nodes includes an active device and a memory subsystem, the method comprising:
in response to generating a virtual address, an active device in a node of the plurality of nodes retrieving a global address and translation function information, wherein the global address and the translation function information are associated with the virtual address;
the active device outputting the global address to a memory subsystem included in the node;
the memory subsystem transmitting the global address to a local physical address by selecting a translation function from a plurality of translation fractions depending upon the translation function information and performing the translation function on the global address; and
an operating system executing on the active device in one of the nodes creating a translation lookaside buffer entry corresponding to the virtual address in response to deciding to replicate data to the one of the nodes from an other one of the nodes, wherein the translation lookaside buffer entry corresponding to the virtual address specifies the global address and the information identifying the translation function.

14. The method of claim 13, wherein if the translation function information identifies a first translation function, the memory subsystem generates local physical address that is equal to the global address.

15. The method of claim 14, further comprising an operating system executing on the active device creating a translation lookaside buffer entry corresponding to the virtual address, wherein the translation lookaside buffer entry includes the global address and the information identifying the first translation function, wherein the operating system selects the first translation function in order to map the global address to the local physical address within the memory subsystem.

16. The method of claim 13, further comprising a device in one of the nodes sending the global address to a device in an additional one of the nodes.

17. The method of claim 16, further comprising an additional memory subsystem in the additional one of the nodes obtaining a different local physical address of the data within the additional memory subsystem by performing a different translation function on the global address based upon the translation function information.

18. The method of claim 13, further comprising determining whether a copy of the data is currently cached by the active device by comparing at least a portion of the global address to a plurality of tags identifying data cached by the active device.

* * * * *

UNITED STATES PATENT AND TRADEMARK OFFICE
CERTIFICATE OF CORRECTION

PATENT NO. : 7,363,462 B2 Page 1 of 1
APPLICATION NO. : 10/817689
DATED : April 22, 2008
INVENTOR(S) : Landin et al.

It is certified that error appears in the above-identified patent and that said Letters Patent is hereby corrected as shown below:

Column 17,

Claim 7, Line 7, please delete "oilier" and substitute -- other --

Column 18,

Claim 13, Line 1, please delete "transmitting" and substitute -- translating --

Claim 13, Line 3, please delete "fractions" and substitute -- functions --

Signed and Sealed this

Eighth Day of July, 2008

JON W. DUDAS
*Director of the United States Patent and Trademark Office*